US012321273B2

United States Patent
Mirza et al.

(10) Patent No.: US 12,321,273 B2
(45) Date of Patent: Jun. 3, 2025

(54) CASCADING EXECUTION OF ATOMIC OPERATIONS (71) Applicants: ADVANCED MICRO DEVICES, INC., Santa Clara, CA (US); ATI TECHNOLOGIES ULC, Markham (CA)

(72) Inventors: Jimshed Mirza, Markham (CA); Mark Fowler, Boxborough, MA (US)

(73) Assignees: ADVANCED MICRO DEVICES, INC., Santa Clara, CA (US); ATI TECHNOLOGIES ULC, Markham (CA)

(*) Notice: Subject to any disclaimer, the term of this patent is extended or adjusted under 35 U.S.C. 154(b) by 0 days.

(21) Appl. No.: 17/563,869

(22) Filed: Dec. 28, 2021

(65) Prior Publication Data
US 2023/0205696 A1 Jun. 29, 2023

(51) Int. Cl.
*G06F 12/08* (2016.01)
*G06F 9/30* (2018.01)
*G06F 12/0811* (2016.01)
*G06F 12/084* (2016.01)
*G06F 12/0895* (2016.01)

(52) U.S. Cl.
CPC .......... *G06F 12/084* (2013.01); *G06F 9/3009* (2013.01); *G06F 12/0811* (2013.01); *G06F 12/0895* (2013.01)

(58) Field of Classification Search
CPC .. G06F 12/084; G06F 9/3009; G06F 12/0811; G06F 12/0895
See application file for complete search history.

(56) References Cited

U.S. PATENT DOCUMENTS

| 7,246,187 B1* | 7/2007 | Ezra ........................ G06F 9/526 710/200 |
| 2010/0250856 A1* | 9/2010 | Owen .................... G06F 12/084 711/135 |
| 2014/0173212 A1* | 6/2014 | Archer .................. G06F 9/5016 711/129 |
| 2015/0254239 A1 | 9/2015 | Ma et al. |
| 2019/0026149 A1* | 1/2019 | Jiang ........................ G06T 1/20 |

FOREIGN PATENT DOCUMENTS

| EP | 2648107 A1 | 10/2013 | |
| JP | 2016224882 A | * 12/2016 | .......... G06F 12/0811 |

OTHER PUBLICATIONS

International Search Report and Written Opinion, PCT/US2022/052995, Apr. 20, 2023, 13 pages.

* cited by examiner

*Primary Examiner* — Masud K Khan (57) ABSTRACT

Cascading execution of atomic operations, including: receiving a request for each thread of a plurality of threads to perform an atomic operation, wherein the plurality of threads comprises a plurality of thread subsets each corresponding to a local memory, wherein the local memory for a thread subset is accessible by the thread subset and inaccessible to a remainder of threads in the plurality of threads; generating a plurality of intermediate results by performing, by each thread subset, the atomic operation in the local memory corresponding to the thread subset; and generating a result for the request by aggregating the plurality of intermediate results in a shared memory accessible to all threads in the plurality of threads.

20 Claims, 5 Drawing Sheets

CASCADING EXECUTION OF ATOMIC OPERATIONS

BACKGROUND

Where multiple threads need to execute an atomic operation with a same scope (area of memory), the atomic operations must be executed in an area of memory accessible to each thread. A shared memory such as a shared cache is usable as a scope for the atomic operations as each thread has access to the shared cache. However, due to the distance of the shared cache from the dies or cores executing the threads, performance suffers as the number of threads and atomic operations to be executed increases.

DETAILED DESCRIPTION

Various processes or software applications cause multiple threads to each execute atomic operations. For example, the execution of a same atomic operation across multiple threads is used to generate histograms or performance metrics for the executing threads or the computing system. These atomic operations are targeted to a same scope or area of memory. Accordingly, the scope of the atomic operations must be accessible to all threads that will execute the atomic operation.

A shared memory such as a shared cache is usable as a scope for the atomic operations as each thread has access to the shared cache. However, due to the distance of the shared cache from the dies or cores executing the threads, performance suffers as the number of threads and atomic operations to be executed increases.

To that end, the present specification sets forth various implementations for cascading execution of atomic operations. In some implementations, a method of cascading execution of atomic operations includes: receiving a request for each thread of a plurality of threads to perform an atomic operation, wherein the plurality of threads comprises a plurality of thread subsets each corresponding to a local memory, wherein the local memory for a thread subset is accessible by the thread subset and inaccessible to a remainder of threads in the plurality of threads; generating a plurality of intermediate results by performing, by each thread subset, the atomic operation in the local memory corresponding to the thread subset; and generating a result for the request by aggregating the plurality of intermediate results in a shared memory accessible to all threads in the plurality of threads.

In some implementations, each thread subset is executed on a respective core of a plurality of cores, and wherein the local memory for each thread subset comprises a cache implemented on the respective core. In some implementations, the shared memory includes a shared cache. In some implementations, the shared cache comprises a last level cache. In some implementations, the method further includes evicting, for each intermediate result of the plurality of intermediate results, a cache line and a tag indicating an opcode for the atomic operation. In some implementations, aggregating the plurality of intermediate results includes performing, in the shared memory, one or more other atomic operations based on the tag. In some implementations, generating the plurality of intermediate results includes initializing, in the local memory corresponding to each thread subset, a cache line.

The present specification also describes various implementations of a processor for cascading execution of atomic operations. Such a processor performs steps including: receiving a request for each thread of a plurality of threads to perform an atomic operation, wherein the plurality of threads includes a plurality of thread subsets each corresponding to a local memory, wherein the local memory for a thread subset is accessible by the thread subset and inaccessible to a remainder of threads in the plurality of threads; generating a plurality of intermediate results by performing, by each thread subset, the atomic operation in the local memory corresponding to the thread subset; and generating a result for the request by aggregating the plurality of intermediate results in a shared memory accessible to all threads in the plurality of threads.

In some implementations, wherein each thread subset is executed on a respective core of a plurality of cores, and wherein the local memory for each thread subset includes a cache implemented on the respective core. In some implementations, the shared memory includes a shared cache. In some implementations, wherein the shared cache includes a last level cache. In some implementations, the steps further include evicting, for each intermediate result of the plurality of intermediate results, a cache line and a tag indicating an opcode for the atomic operation. In some implementations, aggregating the plurality of intermediate results includes performing, in the shared memory, one or more other atomic operations based on the tag. In some implementations, generating the plurality of intermediate results includes initializing, in the local memory corresponding to each thread subset, a cache line.

Also described in this specification are various implementations of an apparatus for cascading execution of atomic operations. Such an apparatus includes: computer memory; a processor operatively coupled to the computer memory performing steps including: receiving a request for each thread of a plurality of threads to perform an atomic operation, wherein the plurality of threads includes a plurality of thread subsets each corresponding to a local memory, wherein the local memory for a thread subset is accessible by the thread subset and inaccessible to a remainder of threads in the plurality of threads; generating a plurality of intermediate results by performing, by each thread subset, the atomic operation in the local memory corresponding to the thread subset; and generating a result for the request by aggregating the plurality of intermediate results in a shared memory accessible to all threads in the plurality of threads.

In some implementations, each thread subset is executed on a respective core of a plurality of cores, and wherein the local memory for each thread subset includes a cache implemented on the respective core. In some implementations, the shared memory includes a shared cache. In some implementations, the shared cache includes a last level cache. In some implementations, the steps further include evicting, for each intermediate result of the plurality of intermediate results, a cache line and a tag indicating an opcode for the atomic operation. In some implementations, aggregating the plurality of intermediate results includes performing, in the shared memory, one or more other atomic operations based on the tag.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows include implementations in which the first and second features are formed in direct contact, and also include implementations in which additional features be formed between the first and second features, such that the first and second features are not in direct contact. Further, spatially relative terms, such as "beneath," "below," "lower," "above," "upper," "back," "front," "top," "bottom," and the like, are used herein for ease of description to describe one element or feature's relationship to another element(s) or feature(s) as illustrated in the figures. Similarly, terms such as "front surface" and "back surface" or "top surface" and "back surface" are used herein to more easily identify various components, and identify that those components are, for example, on opposing sides of another component. The spatially relative terms are intended to encompass different orientations of the device in use or operation in addition to the orientation depicted in the figures.

Figure 1:
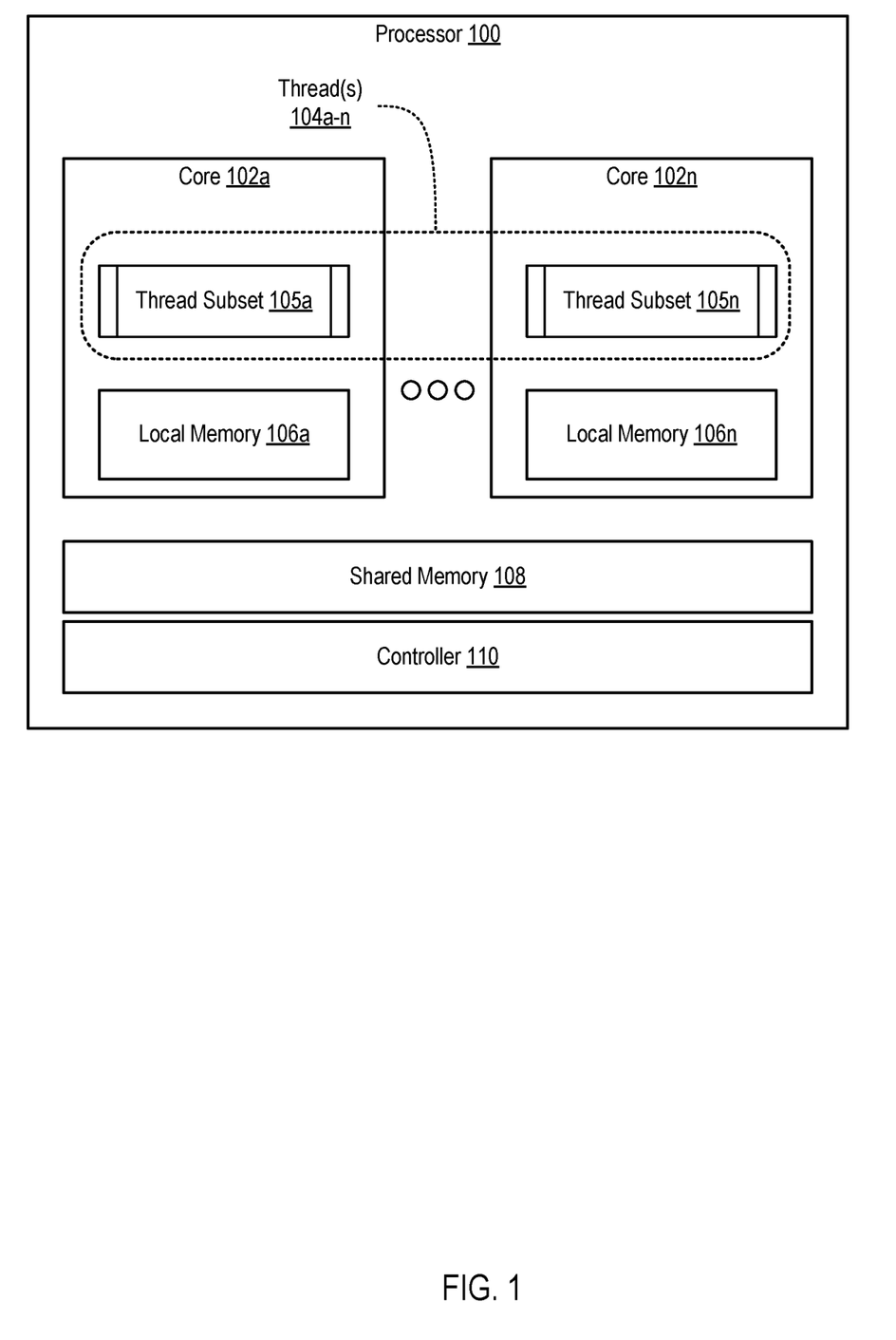
FIG. 1 is a block diagram of an example processor for cascading execution of atomic operations according to some implementations.

FIG. 1 is a block diagram of a non-limiting example processor 100. The example processor 100 can be implemented in a variety of computing devices, including mobile devices, personal computers, peripheral hardware components, gaming devices, set-top boxes, parallel accelerators (e.g., a graphics processing unit (GPU), a machine learning accelerator, a cryptocurrency mining accelerator) and the like. The processor 100 includes multiple cores 102a-n. Each core 102a-n is a separately operating processing unit that reads and executes program instructions. Each core 102a-n executes one or more threads 104a-n. Each thread 104a-n is an independently managed sequence of processes and instructions. A thread or group of threads executed on a single core, is referred to as a thread subset. Such a thread subset accesses memory local to the core and is restricted from accessing memory local to other cores. In the example of FIG. 1, each thread subset 105a-105n includes one or more threads of the plurality of threads 104a-n and is executed on a different processor core 102a-n. The threads of a thread subset 105a-n executed on a given core 102a-n are executed concurrently (e.g., in parallel) to other threads executed on the core 102a-n. For example, where the core 102a executes a thread subset 105a that includes multiple threads, the multiple threads are executed in parallel on the core 102a.

Each core 102a-n also includes a portion of local memory 106a-n. The local memory 106a-n for a given core 102a-n includes memory that is accessible to the thread subset 105a-n executed on that core 102a-n, but is inaccessible to any other thread subset 105a-n executed on another core 102a-n. For example, the local memory 106a on the core 102a is accessible to threads of the thread subset 105a executed on the core 102a, but is inaccessible to thread subset 105n executed on the core 102n. Similarly, the local memory 106n on the core 102n is accessible to threads of the thread subset 105n executed on the core 102n but is inaccessible to threads of the thread subset 105a executed on the core 102a. In some implementations, the local memory 106a includes a cache such as an L2 cache. Thus, thread subsets 105a-n are each executed on a respective core 102a-n and correspond to a respective local memory 106a-n. The processor 100 also includes a shared memory 108. The shared memory 108 is a portion of memory accessible to all threads 104a-n and thus, all thread subsets 105a-n. In some implementations, the shared memory 108 includes a shared cache such as a last level cache.

The processor 100 also includes a controller 110. The controller 110 processes commands to read data from and write data to memory, including the local memory 106a-n and the shared memory 108. Accordingly, the controller 110 provides or issues commands to the local memory 106a-n and memory 108 to perform particular operations, such as atomic operations, in the targeted memory. As an example, the controller 110 includes a memory controller, a cache controller, or other controller as can be appreciated.

A request is received (e.g., by the controller 110) for each thread 104a-n to perform an atomic operation. For example, an operating system or executed software application needs each thread 104a-n to perform the atomic operation in order to generate a histogram or other metric describing the performance of the threads 104a-n. The atomic operation is an operation that is executed independently of any other processes and is not subject to interrupts (e.g., an operation that can be executed atomically). Such atomic operations include, for example, adding, subtracting, incrementing, decrementing, min functions, max functions, and other atomic operations as can be appreciated.

The atomic operations performed by each thread 104a-n are directed to a same scope or area of memory. For example, where the atomic operation is an increment operation (e.g., adding one to a previously stored value), each atomic operation is directed to increment a same value stored in memory. In some implementations, as each thread 104a-n is directed to perform an atomic operation on a same scope of memory, each atomic operation is directed to be applied to a portion of shared memory 108. For example, in some implementations, each thread 104a-n is directed to perform the atomic operation on a portion of memory (e.g., main memory or addressable memory) cached into the shared memory 108. In other implementations, each thread 104a-n is directed to perform the atomic operation on a portion of the shared memory 108 (e.g., a cache line) that does not necessarily reflect or correspond to a portion of main memory or addressable memory.

In some implementations, the request is embodied as a singular command. In other implementations, the request is embodied as multiple commands or requests. For example, a scheduler or other component of an operating system executes or issues, for each thread 104a-n, a respective command or instruction to execute the atomic operation.

Instead of each thread 104a-n directly executing the atomic operation in shared memory 108, each thread 104a-n executes the atomic operation in their respective local memory 106a-n. For example, the threads of thread subset 105a execute the atomic operation on a portion of local memory 106a. In this example, where the atomic operation is an increment operation, each thread of the thread subset 105a increments a same value in the local memory 106a. In some implementations, before executing the atomic operations, a portion of each local memory 106a-n is initialized (e.g., by the controller 110). In implementations where the local memory 106a-n is a cache, the portion of memory initialized includes a cache line. In some implementations, initializing the portion of memory includes storing a default value in the portion of memory (e.g., zero or another default value). For example, in some implementations, initializing the portion of memory includes storing, in a cache line of local memory 106, zeros in the entire cache line. In some implementations, the default value is dependent on a type of atomic operation to be performed. For example, for an increment or ADD operation, the default value is zero. As another example, where the atomic operation is a min operation (e.g., unsigned minimum (UMIN) or signed minimum (SMIN)), the default value is a largest possible positive value able to be stored in the cache line. As a further example, where the atomic operation is a max operation (e.g., unsigned maximum (UMAX) or signed maximum (SMAX)), the default value is a lowest possible negative value able to be stored in the cache line. Thus, a first atomic operation is applied to the initialized zero value, while subsequent atomic operations are applied to the result of the previously applied atomic operation.

In some implementations, after a given thread of a thread subset 105a-n performs an atomic operation in local memory 106a-n, a portion of local memory 106a-n (e.g., a cache line) to which an atomic operation is performed is tagged with an indication of the atomic operation (e.g., an opcode for the atomic operation). Where other threads of other thread subsets 105a-n perform the atomic operation on the same portion of memory (e.g., the same cache line), the tag is preserved or remains unchanged.

After each thread 104a-n of the thread subsets 105a-n performs the atomic operation in local memory 106a-n, each local memory 106a-n stores an intermediate result based on the execution of the atomic operations. These intermediate results are then aggregated in shared memory 108 to generate a result for the request (e.g., a result reflecting the execution of the atomic operation by all threads 104a-n). In some implementations the intermediate results are copied from local memory 106a-n into the shared memory 108. For example, in some implementations, after each thread 104a-n executes the atomic operation in local memory 106a-n, a cache line from local memory 106a-n storing the intermediate result is evicted from the local memory 106a-n into the shared memory 108. In some implementations, the cache line from local memory 106a-n is evicted into the shared memory 108 with a tag indicating the atomic operation performed in local memory 106a-n. For example, in some implementations, the tag indicates an opcode for the atomic operation. Thus, after evicting the cache lines from the local memories 106a-n into the shared memory 108, the shared memory 108 stores each intermediate result from the local memories 106a-n. In some implementations, where an evicted cache line includes any data or bytes not accessed or modified by threads 104a-n before eviction, a byte mask is included with the evicted cache line to prevent modification of those bytes in shared memory 108.

In some implementations, aggregating the intermediate results in shared memory 108 includes performing one or more atomic operations in the shared memory 108 to generate the result. In some implementations, the one or more atomic operations performed in the shared memory 108 correspond to the opcode of the atomic operation indicated in the tag provided with the evicted cache line. As an example, where the atomic operation is an add operation, the intermediate results in the shared memory 108 are added together using atomic add operations to generate the result. In some implementations, the one or more atomic operations performed in the shared memory 108 are based on, but do not match, the opcode of the atomic operation indicated in the tag provided with the evicted cache line. As an example, where increment atomic operations were performed in the local memories 106a-n, an add atomic operation is performed in the shared memory 108 to sum the intermediate results.

In some implementations, where performing atomic operations cause cache lines of local memory 106a-n to be tagged with opcodes of the atomic operations, the tags are used to determine whether a particular cache line should be evicted to shared memory 108. As an example, assume that a first thread 104a-n performs an atomic operation (e.g., an ADD operation) in local memory 106a-n and tags the cache line with an ADD tag. Assume a second thread 104a-n performs another ADD operation directed to the same cache line of local memory 106a-n. In some implementations, the opcode of the atomic operation performed by the second thread 104a-n is compared to the tag of the cache line. As the tag matches the opcode of the atomic operation, the second thread 104a-n performs the ADD operation in the local memory 106a-n. Where the opcode differs from the tag, the cache line is evicted to shared memory 108 with the tag and the atomic operation is performed as if it was a cache miss (due to the previously stored cache line being evicted). For example, where the atomic operation is a READ operation, a line from shared memory 108 is read into the local memory 106a-n. As another example, where the atomic operation is an unsigned minimum (UMIN) operation, a line of local memory 106a-n is initialized with an appropriate value (e.g., a largest positive value).

One skilled in the art will appreciate that the approaches described herein provide advantages over executing the atomic operations directly in shared memory 108. For example, executing the atomic operations in shared memory 106a-n allow for concurrent execution of atomic operations across the cores 102a-n, as opposed to serially executing each atomic operation in shared memory 108. Moreover, as the local memory 106a-n is located on the respective cores 102a-n, the atomic operations are performed more quickly in local memory 106a-n when compared to executing in shared memory 108.

Although the approaches disclosed herein are described with respect to threads 104a-n executed on respective cores 102a-n, one skilled in the art will appreciate that these approaches are also applicable to threads 104a-n executed on separate dies with each die including a respective local memory 106a-n.

Figure 2:
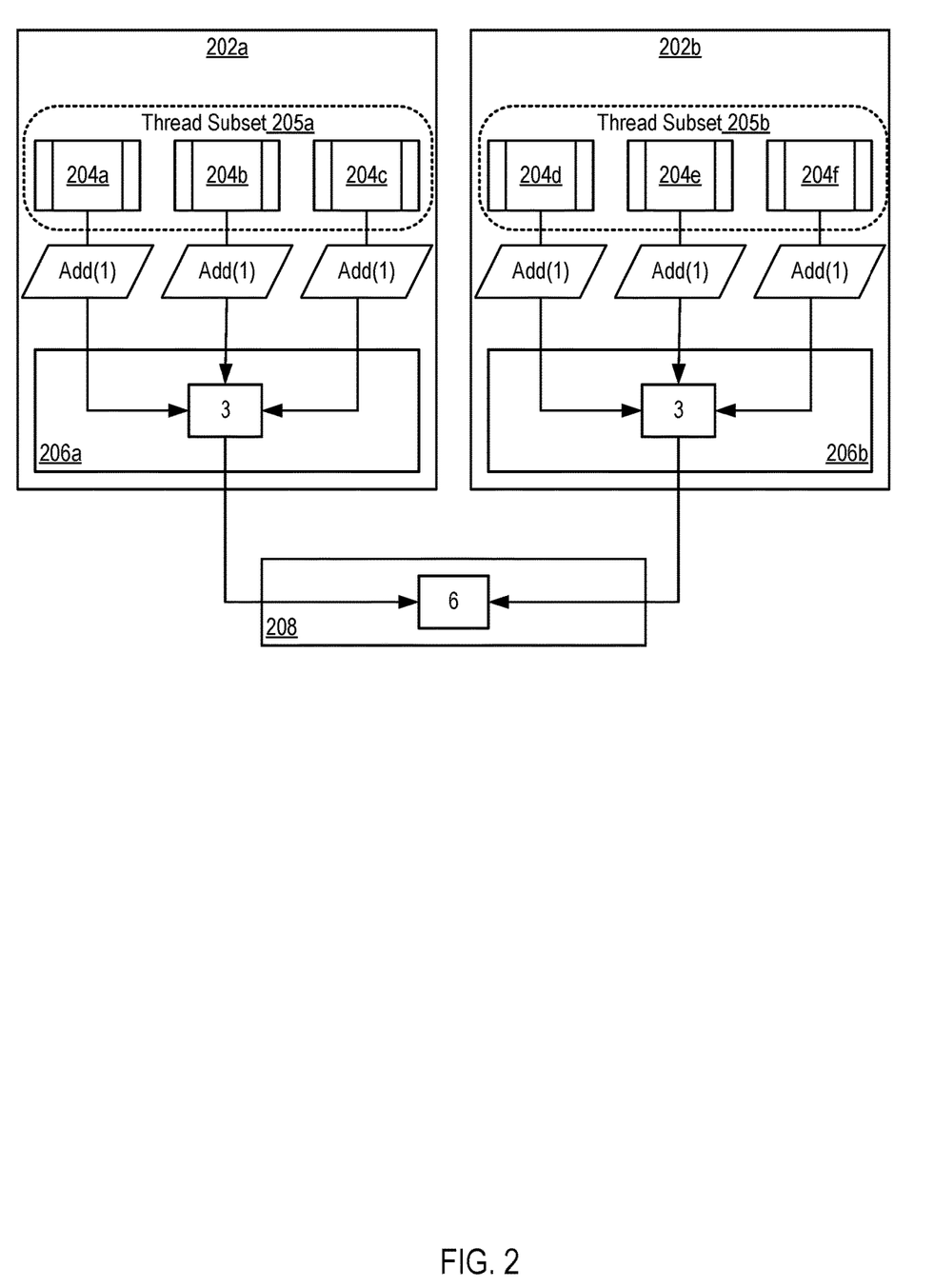
FIG. 2 is a diagram of an example execution of cascading execution of atomic operations according to some implementations.

FIG. 2 shows an example execution of cascading execution of atomic operations according to some implementations of the present disclosure. The example of FIG. 2 includes cores 202a,b. The cores 202a,b are similar to the cores 102a-n described in FIG. 1. The core 202a is executing a thread subset 205a comprising threads 204a,b,c and the core 202b is executing a thread subset 205b threads 204d, c,e. The core 202a includes a local cache 206a (e.g., a local memory 106a-n) and the core 202b includes a local cache 206b (e.g., another local memory 106a-n). The threads of thread subset 205a can access the local cache 206a, but not the local cache 206b. Similarly, the threads of thread subset 205b can access the local cache 206b, but not the local cache 206a. A request is received (e.g., by a controller 110, not shown) to perform an atomic operation to add "1" by all threads 204a-f. In some implementations, a cache line in each of the local caches 206a,b is initialized by setting all values in the cache line to zero.

After the cache lines in each of the local caches 206a,b are initialized, the threads 204a-f perform the atomic add operations in the initialized cache lines. In other words, threads 204a-c of thread subset 205a perform the atomic add operations in the initialized cache line of local cache 206a, and the threads 204d-f of thread subset 205b perform the atomic add operations in the initialized cache line of local cache 206b. Thus, local caches 206a,b each store an intermediate result of "3" reflecting three executions of the atomic add operation.

Local caches 206a,b each evict their respective cache lines storing the intermediate results into a shared cache 208 (e.g., a shared memory 108). In some implementations, the cache lines are evicted with a tag indicating the opcode for the atomic add operation. After the cache lines have been evicted, an atomic add operation is performed in the shared cache 208 to add the intermediate results from the received evicted cache lines, thereby generating a final result of "6," equivalent to each of the six threads 204a-f performing the atomic add operation in the shared cache 208.

In some implementations, the processor 100 of FIG. 1 is implemented in a computer 300. For example, the processor 100 is implemented as at least one processor 302. In addition to at least one processor 302, the computer 300 of FIG. 3 includes random access memory (RAM) 304 which is connected through a high speed memory bus 306 and bus adapter 308 to processor 302 and to other components of the computer 300. Stored in RAM 304 is an operating system 310. The operating system 310 in the example of FIG. 3 is shown in RAM 304, but many components of such software typically are stored in non-volatile memory also, such as, for example, on data storage 312, such as a disk drive.

Figure 3:
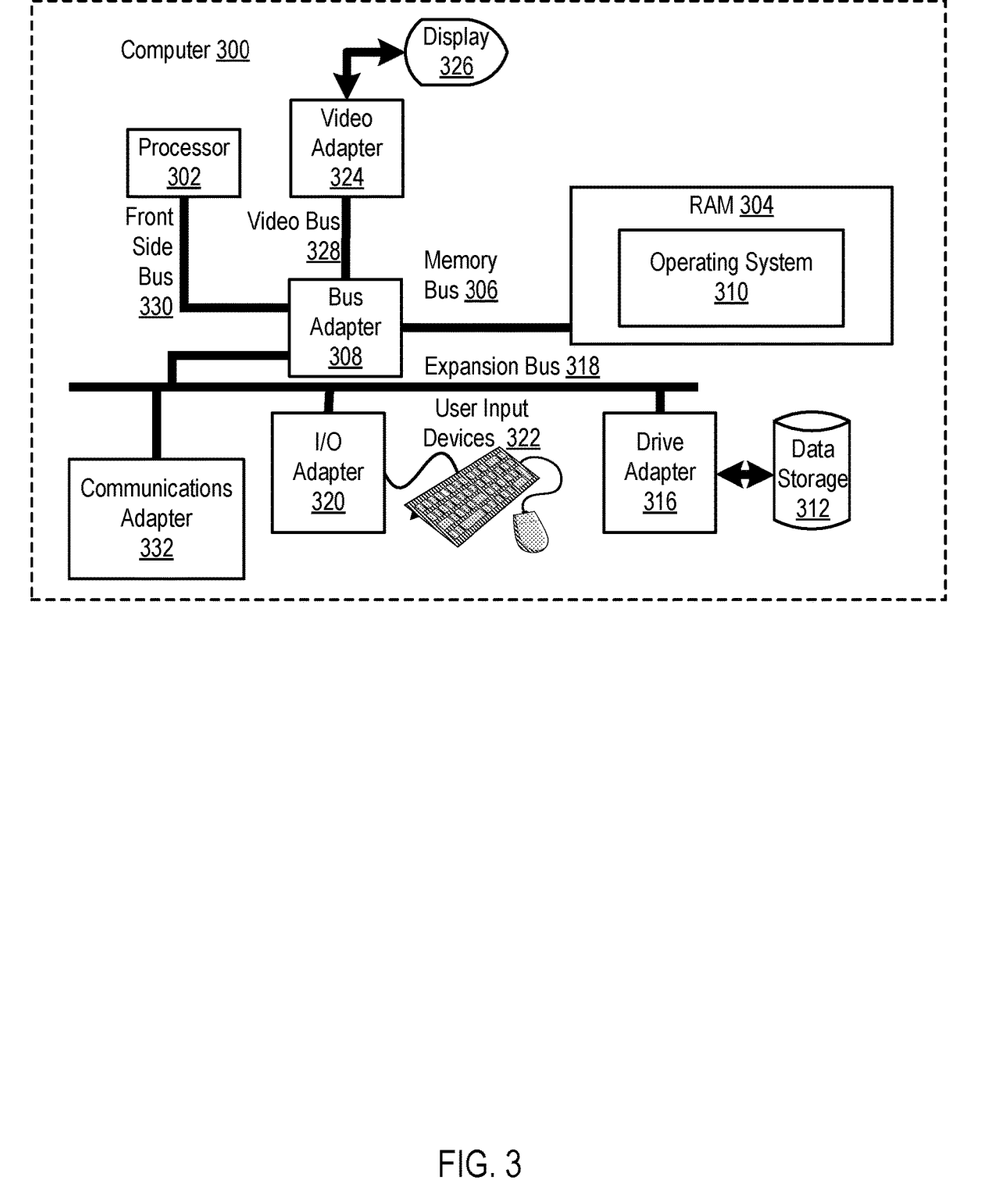
FIG. 3 is a block diagram of an example computer for cascading execution of atomic operations according to some implementations.

The computer 300 of FIG. 3 includes disk drive adapter 316 coupled through expansion bus 318 and bus adapter 308 to processor 302 and other components of the computer 300. Disk drive adapter 316 connects non-volatile data storage to the computer 300 in the form of data storage 312. Such disk drive adapters include Integrated Drive Electronics (IDE') adapters, Small Computer System Interface (SCSI') adapters, and others as will occur to those of skill in the art. In some implementations, non-volatile computer memory is implemented as an optical disk drive, electrically erasable programmable read-only memory (so-called 'EEPROM' or 'Flash' memory), RAM drives, and so on, as will occur to those of skill in the art.

The example computer 300 of FIG. 3 includes one or more input/output ('I/O') adapters 320. I/O adapters implement user-oriented input/output through, for example, software drivers and computer hardware for controlling output to display devices such as computer display screens, as well as user input from user input devices 322 such as keyboards and mice. The example computer 300 of FIG. 3 includes a video adapter 324, which is an example of an I/O adapter specially designed for graphic output to a display device 326 such as a display screen or computer monitor. Video adapter 324 is connected to processor 302 through a high speed video bus 328, bus adapter 308, and the front side bus 330, which is also a high speed bus.

The exemplary computer 300 of FIG. 3 includes a communications adapter 332 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters 332 implement the hardware level of data communications through which one computer sends data communications to another computer, directly or through a data communications network. Such communication adapters 332 include modems for wired dial-up communications, Ethernet (IEEE 802.3) adapters for wired data communications, and 802.11 adapters for wireless data communications.

Figure 4:
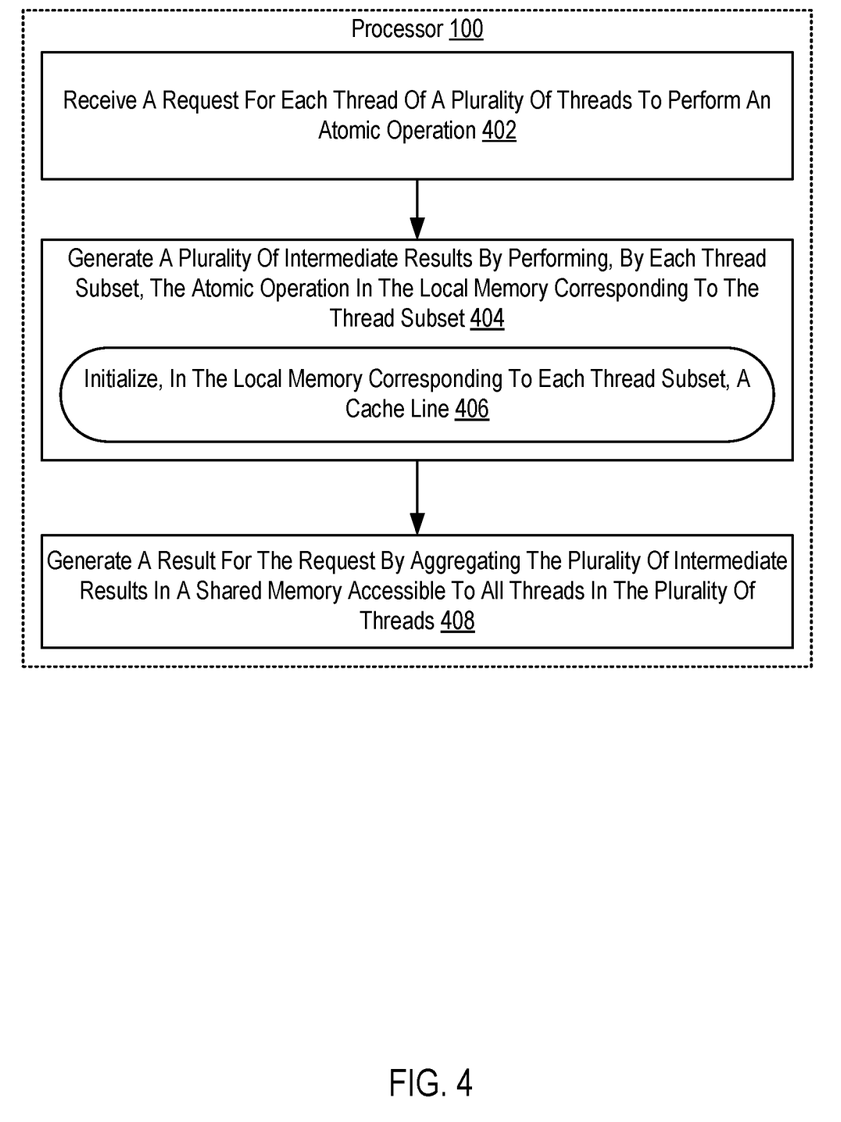
FIG. 4 is a flowchart of an example method for cascading execution of atomic operations according to some implementations.

For further explanation, FIG. 4 sets forth a flow chart illustrating an example method for cascading execution of atomic operations according to some implementations of the present disclosure. The method of FIG. 4 is performed, for example, in a processor 100. The method of FIG. 4 includes receiving 402 request for each thread 104a-n of a plurality of threads 104a-n to perform an atomic operation. Each thread 104a-n is executed on one of a plurality of cores 102a-n. In other words, the plurality of threads 104a-n includes a plurality of thread subsets, with each thread subset executed on a respective core 102a-n. As each core 102a-n includes a respective local memory 106a-n, each thread subset corresponds to a local memory 106a-n, with the local memory 106a-n for a thread subset being accessible to the thread subset and inaccessible to other threads 104a-n outside of the thread subset. In some implementations, the local memory 106a-n includes a local cache such as an L2 cache.

The method of FIG. 4 also includes generating 404 a plurality of intermediate results by performing, by each thread subset, the atomic operation in the local memory 106a-n corresponding to the thread subset. As is set forth above, each thread subset is executed on a respective core 102a-n that includes a local memory 106a-n. Instead of performing the atomic operation in a shared memory 108 such as a shared cache that is accessible to all threads 104a-n, the threads 104a-n perform the atomic operations in their accessible local memory 106a-n. The result of each thread subset performing the atomic operation in the local memory 106a-n is an intermediate result.

In some implementations, generating 404 the plurality of intermediate results includes initializing 406, in the local memory 106a-n corresponding to each thread subset, a cache line. In some implementations, each local memory 106a-n includes a cache implemented on a respective core 102a-n. Accordingly, for the threads 104a-n on a given core 102a-n to perform the atomic operation in the cache, a cache line is initialized. For example, the cache line is zeroed out such that all data in the cache line is equal to zero. A first atomic operation is then performed on the initialized value, with each subsequent atomic operation performed on the result of the preceding atomic operation. In some implementations, the default value is dependent on a type of atomic operation to be performed. For example, for an increment or ADD operation, the default value is zero. As another example, where the atomic operation is a min operation (e.g., unsigned minimum (UMIN) or signed minimum (SMIN)), the default value is a largest possible positive value able to be stored in the cache line. As a further example, where the atomic operation is a max operation (e.g., unsigned maximum (UMAX) or signed maximum (SMAX)), the default value is a lowest possible negative value able to be stored in the cache line.

The method of FIG. 4 also includes generating 408 a result for the request by aggregating the plurality of intermediate results in a shared memory 108 accessible to all threads 104a-n in the plurality of threads 104a-n. For example, the intermediate results are copied or moved into the shared memory 108. The intermediate results are then aggregated in the shared memory 108 by performing one or more atomic operations in the shared memory 108 on the intermediate results.

Figure 5:
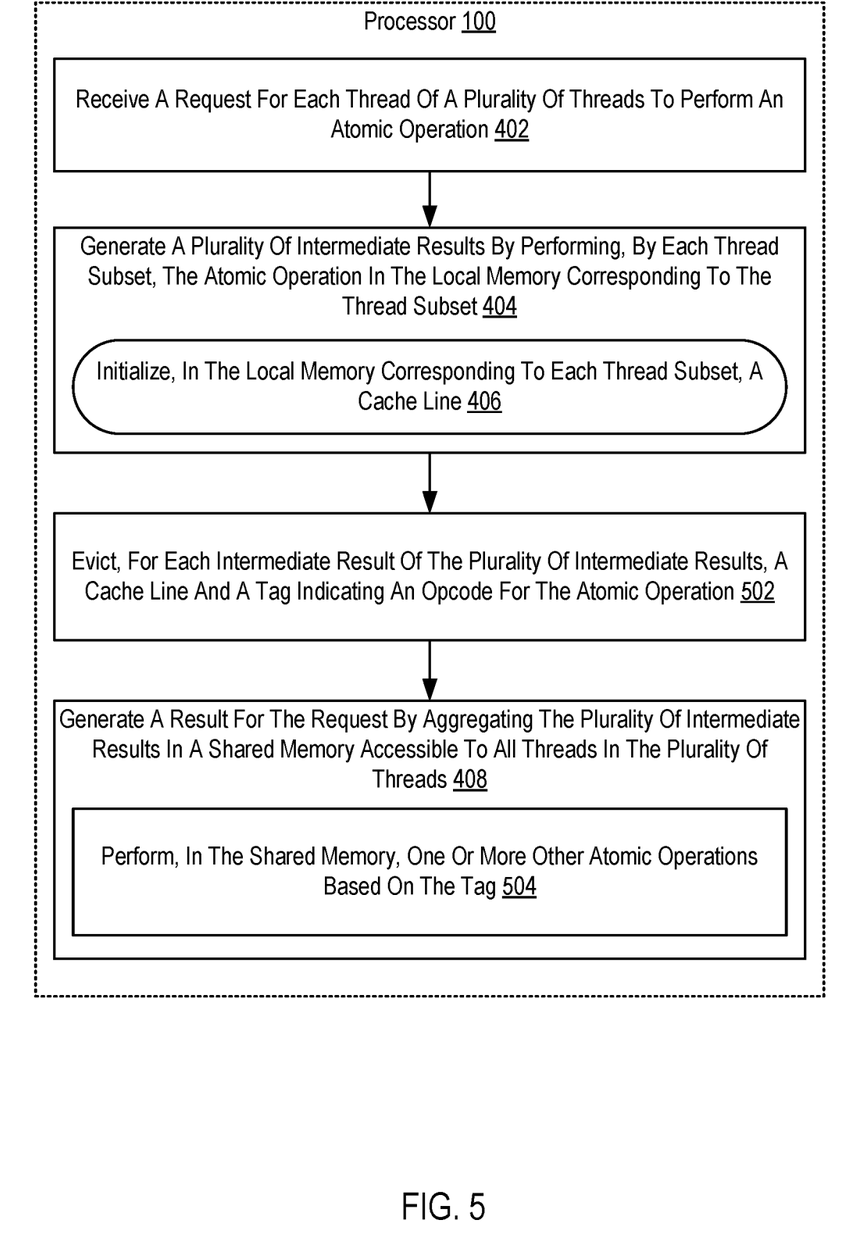
FIG. 5 is a flowchart of a variation of the method of FIG. 4.

For further explanation, FIG. 5 sets forth a flow chart illustrating a variation of the example method of FIG. 4. The method of FIG. 5 differs from that of FIG. 4 in that the method of FIG. 5 also includes evicting 502, for each intermediate result of the plurality of intermediate results, a cache line and a tag indicating an opcode for the atomic operation. Where the local memories 106a-n include a local cache, the intermediate result are stored in a particular cache line. As described above, each local memory 106a-n will include, in a cache line, an intermediate result based on the atomic operations being executed in the local memory 106a-n by the corresponding thread subset. By evicting the cache line to the shared memory 108, the intermediate results are moved to the shared memory 108 for aggregation. The cache lines are evicted with a tag indicating the opcode for the atomic operation used to generate the intermediate results.

In the method of FIG. 5, generating 408 the result includes performing 504, in the shared memory 108, one or more other atomic operations based on the tag. The one or more other atomic operations are performed in the shared memory 108 to aggregate the intermediate results into a final result. In some implementations, the atomic operations performed on the intermediate results matches the atomic operation of the opcode for the tag. As an example, where the tag indicates an add operation, an add operation is performed on the intermediate results in order to sum the intermediate results into a final result. In some implementations, the atomic operations performed on the intermediate results are based on, but do not match, the atomic operation of the opcode for the tag. As an example, where the tag indicates a decrement operation (e.g., subtracting by one), a subtraction operation is performed on the intermediate results in order to aggregate the intermediate results into a final result.

In view of the explanations set forth above, readers will recognize that the benefits of cascading execution of atomic operations include improved performance of a computing system by providing accelerated and parallelized execution of atomic operations in local memory before aggregation in shared memory.

Exemplary implementations of the present disclosure are described largely in the context of a fully functional computer system for cascading execution of atomic operations. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary implementations described in this specification are oriented to software installed and executing on computer hardware, nevertheless, alternative implementations implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some implementations, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various implementations of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various implementations of the present disclosure. The descriptions in this specification are for purposes of illustration only and are not to be construed in a limiting sense. The scope of the present disclosure is limited only by the language of the following claims.

What is claimed is:

1. A processor for cascading execution of atomic operations, the processor comprising:
   a controller circuit configured to receive a request for each thread of a plurality of threads to perform an atomic operation, wherein the plurality of threads comprises a plurality of thread subsets;
   a plurality of cores, where each thread subset is executed on a respective core, and each core includes a local memory implemented on the core, the local memory of a core accessible by a thread subset executing on the core and inaccessible to a remainder of threads in the plurality of threads, the plurality of cores generating a plurality of intermediate results by each core performing, for each thread of the thread subset executed on the core, the atomic operation in the local memory implemented on the core; and
   a shared memory coupled to each of the plurality of cores, the shared memory accessible to all threads in the plurality of threads, wherein the processor is configured to generate a result for the request by aggregating the plurality of intermediate results from the local memory implemented on each of the plurality of cores into the shared memory accessible to all threads in the plurality of threads.

2. The processor of claim 1, and wherein the local memory for each thread subset comprises a cache implemented on the respective core.

3. The processor of claim 2, wherein generating the plurality of intermediate results comprises initializing, in the local memory implemented on each of the plurality of cores, a cache line.

4. The processor of claim 1, wherein the shared memory comprises a shared cache.

5. The processor of claim 4, wherein the shared cache comprises a last level cache.

6. The processor of claim 1, wherein each core evicts a cache line and a tag indicating an opcode for the atomic operation for each intermediate result of the plurality of intermediate results.

7. The processor of claim 6, wherein aggregating the plurality of intermediate results comprises performing, in the shared memory, one or more other atomic operations based on the tag.

8. A method of cascading execution of atomic operations, the method comprising:
   receiving a request for each thread of a plurality of threads to perform an atomic operation, wherein the plurality of threads comprises a plurality of thread subsets, wherein each thread subset is executed on a respective core of a plurality of cores and each core includes a local memory implemented on the core, wherein the local memory for a thread subset is accessible by the thread subset and inaccessible to a remainder of threads in the plurality of threads;
   generating a plurality of intermediate results by each core performing, for each thread of the thread subset executed on the core, the atomic operation in the local memory implemented on the core; and
   generating a result for the request by aggregating the plurality of intermediate results from the local memory implemented on each of the plurality of cores into a shared memory accessible to all threads in the plurality of threads.

9. The method of claim 8, wherein the local memory for each thread subset comprises a cache implemented on the respective core.

10. The method of claim 9, wherein generating the plurality of intermediate results comprises initializing, in the local memory implemented on each of the plurality of cores, a cache line.

11. The method of claim 8, wherein the shared memory comprises a shared cache.

12. The method of claim 11, wherein the shared cache comprises a last level cache.

13. The method of claim 8, further comprising evicting, for each intermediate result of the plurality of intermediate results, a cache line and a tag indicating an opcode for the atomic operation.

14. The method of claim 13, wherein aggregating the plurality of intermediate results comprises performing, in the shared memory, one or more other atomic operations based on the tag.

15. An apparatus for cascading execution of atomic operations, comprising:
 computer memory; and
 a processor operatively coupled to the computer memory, the processor configured to:
  receive a request for each thread of a plurality of threads to perform an atomic operation, wherein the plurality of threads comprises a plurality of thread subsets, wherein each thread subset is executed on a respective core of a plurality of cores and each core includes a local memory implemented on the core, wherein the local memory for a thread subset is accessible by the thread subset and inaccessible to a remainder of threads in the plurality of threads;
  generate a plurality of intermediate results by each core performing, for each thread of the thread subset executed on the core, the atomic operation in the local memory implemented on the core; and
  generate a result for the request by aggregating the plurality of intermediate results from the local memory implemented on each of the plurality of cores into a shared memory accessible to all threads in the plurality of threads.

16. The apparatus of claim 15, wherein the local memory for each thread subset comprises a cache implemented on the respective core.

17. The apparatus of claim 15, wherein the shared memory comprises a shared cache.

18. The apparatus of claim 17, wherein the shared cache comprises a last level cache.

19. The apparatus of claim 15, wherein the processor is further configured to evict, for each intermediate result of the plurality of intermediate results, a cache line and a tag indicating an opcode for the atomic operation.

20. The apparatus of claim 19, wherein the processor aggregates the plurality of intermediate results by performing, in the shared memory, one or more other atomic operations based on the tag.

* * * * *